(12) United States Patent
Beneditz

(10) Patent No.: US 7,292,011 B2
(45) Date of Patent: Nov. 6, 2007

(54) ELECTRICAL PROTECTION OF A GENERATOR CONTROLLER

(75) Inventor: Bruce D. Beneditz, Roscoe, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 35 days.

(21) Appl. No.: 11/209,795

(22) Filed: Aug. 23, 2005

(65) Prior Publication Data

US 2007/0046267 A1    Mar. 1, 2007

(51) Int. Cl.
*H20P 11/00*    (2006.01)
(52) U.S. Cl. .............. 322/39; 322/44; 322/45; 361/42; 361/43; 361/44
(58) Field of Classification Search .......... 322/39, 322/44, 45; 361/42, 43, 44
See application file for complete search history.

(56) References Cited

U.S. PATENT DOCUMENTS

| | | | | |
|---|---|---|---|---|
| 4,297,740 A | * | 10/1981 | Hagberg | 361/67 |
| 5,434,509 A | * | 7/1995 | Blades | 324/536 |
| 5,477,150 A | * | 12/1995 | Ham et al. | 324/536 |
| 5,561,605 A | * | 10/1996 | Zuercher et al. | 702/64 |
| 5,602,709 A | * | 2/1997 | Al-Dabbagh | 361/85 |
| 6,128,169 A | * | 10/2000 | Neiger et al. | 361/42 |
| 6,744,260 B2 | * | 6/2004 | Schmalz et al. | 324/555 |
| 7,038,897 B2 | * | 5/2006 | Csanky et al. | 361/42 |

* cited by examiner

*Primary Examiner*—Darren Schuberg
*Assistant Examiner*—Iraj A. Mohandesi
(74) *Attorney, Agent, or Firm*—Carlson, Gaskey & Olds

(57) ABSTRACT

A generator system includes a generator control for providing electrical power to a main generator. The main generator is mechanically coupled to an electrical power source that provides electrical power to the generator control during operation of the main generator. An arc fault device in electrical communication with the electrical power source electrically isolates the power source from the generator control when an arc fault within the generator control is detected.

15 Claims, 2 Drawing Sheets

ELECTRICAL PROTECTION OF A GENERATOR CONTROLLER

BACKGROUND OF THE INVENTION

This invention relates to generator systems and, more particularly, to an arrangement having an arc fault device that electrically isolates a selected portion of the generator system in response to a detected electrical event.

Vehicles, such as an aircraft powered by a gas turbine engine typically include a generator mechanically coupled to the engine. A generator controller controls operation of the main generator by providing electrical power to modulate the generator output. A second generator is mechanically coupled to the main generator and produces electrical power when the main generator operates. The second generator, typically a Permanent Magnet Generator (PMG), delivers the electrical power to the generator controller as a source of electrical power to control the main generator. The second generator provides continuous electrical power while the gas turbine engine operates, and is often referred to as an "uninterruptible" electrical power source to the generator controller.

In conventional generator systems, the generator controller often includes electrical hardware to selectively control the main generator. The electrical hardware may experience electrical faults that increase impedance through the generator controller. In the event of an electrical fault, the uninterruptible power source will continue to deliver electrical power. Disadvantageously, this may result in an undesirable increase in the temperature within the generator controller, which may cause smoke. Smoke in this case is a significant issue on an aircraft as it cannot be cleared using normal smoke clearing procedures. Normal smoke clearing procedures involve selectively turning of electrical power busses and observe if the some is abated. Since this fault is being sourced from an uninterruptible power source it cannot be cleared in this manner and it is beneficial that the generator controller provide the fault clearing function.

Conventional generator systems utilize a fuse or a circuit breaker in the generator controller that respectively blows or trips to electrically isolate the uninterruptible power source from the generator controller to avoid a temperature increase beyond a predetermined level. These systems may be somewhat unsuccessful as faults are typically of relatively high impedance, which may not draw sufficient electrical power to reliably blow the fuse or trip the circuit breaker. Conversely, a highly sensitive fuse or circuit breaker may be prone to undesirably blowing or tripping during what should be considered a normal operational condition.

Accordingly, there is a need for a generator system having an electrical arc fault device that determines an electrical fault and reliably isolates the uninterruptible power source from the generator controller if an electrical fault is detected.

SUMMARY OF THE INVENTION

The generator system according to the present invention includes a generator control that provides electrical power to a main generator. The main generator is mechanically coupled to an electrical power source that provides uninterruptible electrical power to the generator control during operation of the main generator. An arc fault device in electrical communication with the uninterruptible electrical power source electrically isolates the uninterruptible electrical power source from the generator control when there is an arc fault event within the generator control to protect from overheating.

The arc fault device includes a controller having a sensor measuring the electrical input power and a microprocessor that tracks a magnitude of the electrical input power. The microprocessor controls a switch to selectively prevent the electrical input power from flowing through the generator controller in response the tracked electrical input power. If an arc fault is detected, the switch is opened to electrically isolate the generator controller from the source of the uninterruptible electrical input power.

A method of electrically protecting a generator controller according to the present invention includes steps of detecting an electrical fault in the generator controller and selectively preventing transmission of electrical power into the generator controller in response to detection of an electrical arc fault.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
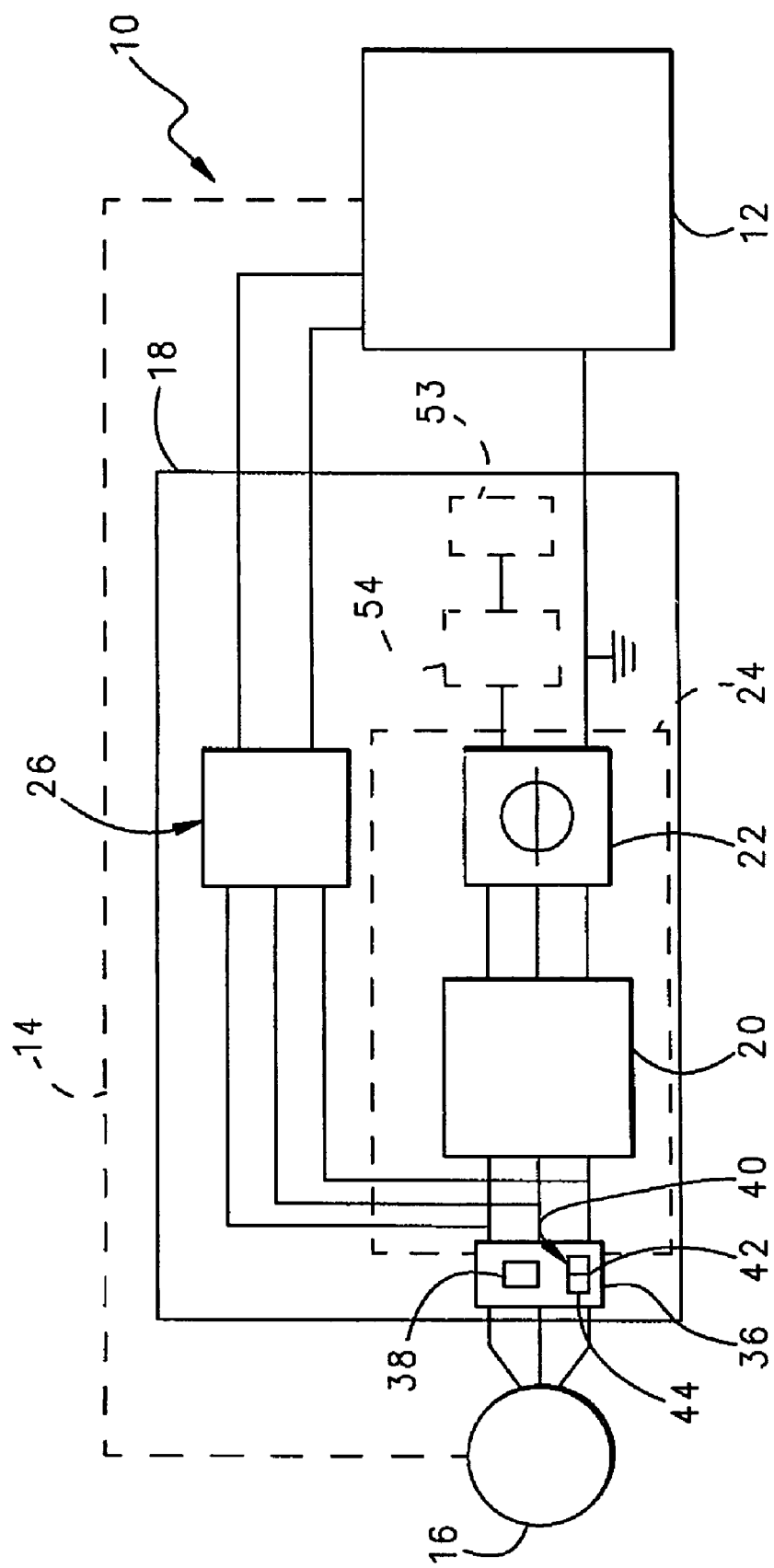
FIG. 1 schematically illustrates an example generator system according to the present invention.

FIG. 1 illustrates selected portions of a generator system 10 including a main generator 12. The main generator 12 is connected to a mechanical coupling 14 and to an electrical supply generator 16, such as a 100 volt three-phase permanent magnet generator. The main generator 12 mechanically drives the electrical supply generator 16 during operation to provide electrical power to a generator control 18. The generator control 18 selectively supplies electrical power to the main generator 12, for example, to modulate electrical output from the main generator 12.

The generator control 18 includes a transformer 20 in series with a diode rectifier 22 that are mounted on a printed wiring board 24. This will be referred to as the PMG power supply. The transformer 20 receives electrical input power from the electrical supply generator 16 during operation of the generator system 10. A generator exciter circuit 26 is electrically connected between the transformer 20 and the electrical supply generator 16 for selectively modulating the electrical input from the electrical supply generator 16 and controlling electrical output to the main generator 12.

An arc fault device 36 is electrically connected between the electrical supply generator 16 and the generator exciter circuit 26. The arc fault device 36 monitors the electrical input power. An electrical arc fault in the generator control 18 downstream from the arc fault device 36 propagates back and causes fluctuation in the input power. The arc fault device 36 detects the fluctuation and prevents electrical power flow into the generator control 18.

The arc fault device 36 includes a switch 38 in electrical communication with an arc fault controller 40. The arc fault controller 40 includes an electrical sensor 42 in communication with a microprocessor 44. The electrical sensor 42 detects the magnitude of the electrical power from the electrical supply generator 16 and transmits corresponding signals to the microprocessor 44 in response thereto. The microprocessor 44 tracks the magnitude of the electrical power. Preferably, the arc fault controller 40 and switch 38 are part of a solid-state power controller, which are semiconductor based circuits with few or no moving parts.

During normal operation of the generator control 18, the arc fault device 36 transmits electrical power from the electrical supply generator 16 to the transformer 20. The microprocessor 44 compares the detected electrical power to upper and lower limits (shown schematically in FIG. 2). If the electrical power is lower than the lower limit or higher than the upper limit, such as from a backward propagating electrical arc fault, the microprocessor 44 commands the switch 38 to open and to electrically isolate the generator control 18 from the electrical supply generator 16. In this state, electrical power from the electrical supply generator 16 is not allowed to flow into the generator control 18 or the transformer 20. Preferably, the upper and lower limits are preset with reference to known electrical operating limitations of the generator control 18.

When there is an electrical arc fault in the generator control 18, such as in the printed wiring board 24, the feature of electrically isolating the electrical supply generator 16 from the generator control 18 provides the benefit of cutting off electrical flow into the portion of the generator control 18 in which the electrical arc fault was initiated. This prevents overheating at the site of the electrical arc fault, which may otherwise produce smoke.

Figure 2:
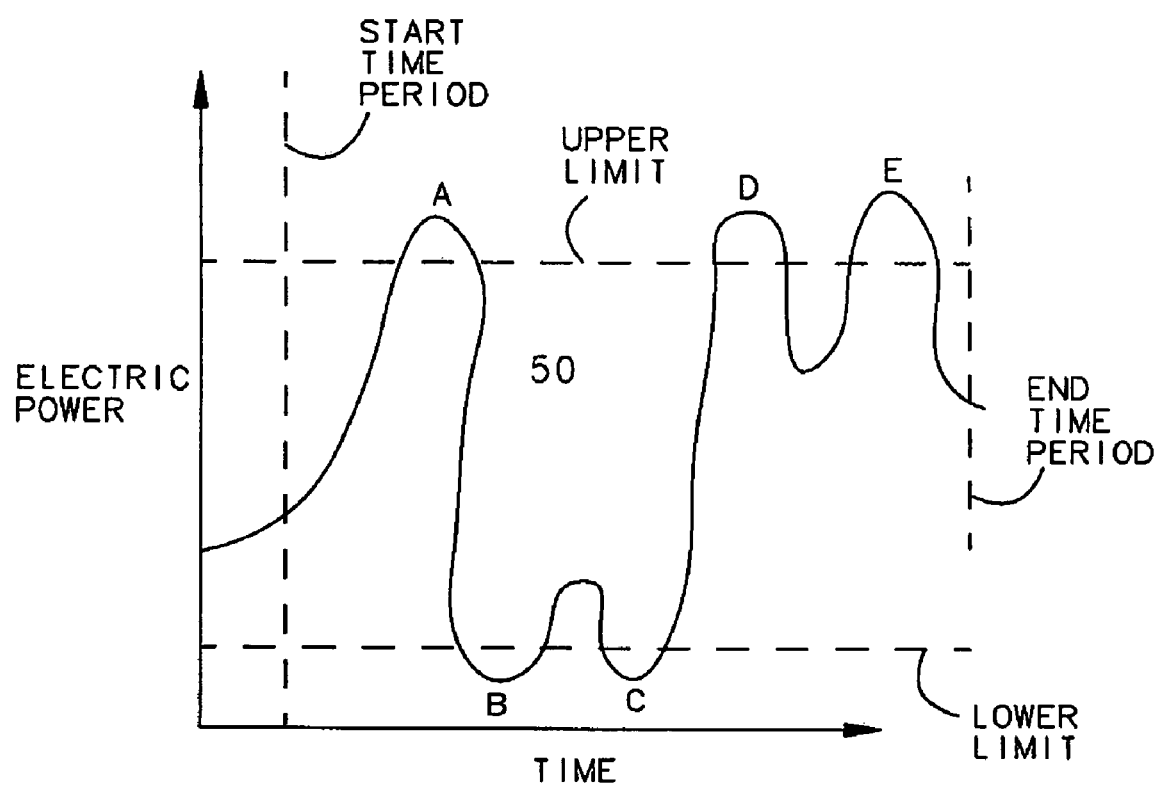
FIG. 2 shows an example electrical signature used by a microprocessor to determine whether to prevent electrical flow.

Referring to FIG. 2, alternatively or in addition to the upper and lower limits, the microprocessor 44 tracks the electrical power over time to produce a signature 50 associated with the fluctuations of the electrical power magnitude. If the microprocessor 44 detects an electrical event, the microprocessor 44 commands the switch 38 to open and electrically isolate the generator control 18 from the electrical supply generator 16.

In the illustration, the electrical power varies outside the range of the upper and lower limits five times (once each at A, B, C, D, and E). The microprocessor 44 tracks the outlying electrical power flow and compares it to predetermined electrical arc fault patterns. The microprocessor 44 opens the switch 38 after five such violations, for example, of the upper or lower limits. Alternatively, three violations of the upper limit and two of the lower limit represents an undesirable electrical fault and the switch 38 is opened. Given this description, it is to be recognized that the upper and lower limits and predetermined fault patterns can be set to meet the demands of a particular application.

Utilizing a signature to track the electrical power minimizes "nuisance" tripping. Prior art fuses and circuit breakers often undesirably blow or trip during normal operation (i.e., nuisance tripping), however, by analyzing the electrical power fluctuation over selected time periods, the microprocessor 44 distinguishes transient spikes or drops in electrical power from other electrical events such as arc faults. In this manner, the microprocessor 44 avoids nuisance tripping and activates the switch 38 for selected electrical events.

Within the generator control 18 there is the PMG power supply that includes the transformer 20 and diode rectifier 22 to operate the generator control 18. The PMG power supply 20 and 22 can be a transformer and diode rectifier as shown or alternatively a solid state switching power supply. A second arc fault device 54 similar to the first is electrically connected downstream from the PMG power supply before the generator control low voltage power supply 53. The second arc fault device 54 is alternatively or additionally utilized with the arc fault device 36. Arc faults that occur down within the control circuitry of the generator control are isolated from the primary arc fault device 36 by arc fault device 54. Also, in this location, the upper and lower limits and signatures may differ from the location of the first arc fault device 36 because of electrical events and electrical loads differ at different locations in the generator system 10. Use of the. second arc fault device 54 in combination with the arc fault device 36 provides additional arc fault detection capability downstream from the arc fault device 54, where electrical characteristics may differ.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A generator system comprising:
    a generator controller;
    an electrical power source including a first generator driven by a second generator that is controlled by said generator controller to provide electrical power to said generator controller; and
    an arc fault device that selectively prevents electrical power flow into said generator controller in response to a detected electrical fault.

2. The system as recited in claim 1, wherein said arc fault device provides a first state which permits transmission of electrical power from said electrical power source to said generator controller and a second state which prevents transmission of electrical power from the electrical power source to said generator controller.

3. The system as recited in claim 2, wherein said arc fault device comprises a solid state power controller having an electrical switch portion for switching between said first state and said second state.

4. The system as recited in claim 1 wherein said electrical generator controller includes a transformer in electrical communication with said electrical power source.

5. The system as recited in claim 4, wherein said electrical generator controller includes a diode rectifier in electrical communication with said transformer.

6. The system as recited in claim 5, wherein said electrical generator controller includes a generator exciter circuit.

7. The system as recited in claim 6, wherein said arc fault device is in electrical communication with said diode transformer electrically downstream from said diode transformer.

8. The system as recited in claim 6, wherein said arc fault device is in electrical communication between said electrical power source and said transformer.

9. The system as recited in claim 1, wherein said electrical power source comprises a 100V three-phase permanent magnet generator.

10. A generator system comprising:
    an generator controller defining an electrical signature;
    an electrical power source that provides electrical power to said generator controller, and
    an electrical fault controller in electrical communication with said electrical power source, said electrical fault controller selectively prevents transmission of said electrical power from the electrical power source to said electrical generator controller in response to said electrical signature.

11. The system as recited in claim 10, wherein said electrical fault controller includes an electrical power sensor.

12. The system as recited in claim 11, wherein said electrical fault controller includes a microprocessor in electrical communication with said electrical power sensor.

13. The system as recited in claim 12, wherein said electrical fault controller includes a solid state switch in electrical communication with said microprocessor.

14. The system as recited in claim 12, wherein said electrical fault controller selectively prevents transmission of the electrical power in response to an electrical arc fault within said electrical generator controller.

15. The system as recited in claim 10, wherein said electrical signature includes a series of electrical power magnitudes within a selected time period.

* * * * *